W. P. DUN LANY.
APPARATUS FOR DISPENSING GRANULAR SUBSTANCES.
APPLICATION FILED DEC. 13, 1912.
1,198,014.
Patented Sept. 12, 1916.
2 SHEETS—SHEET 1.
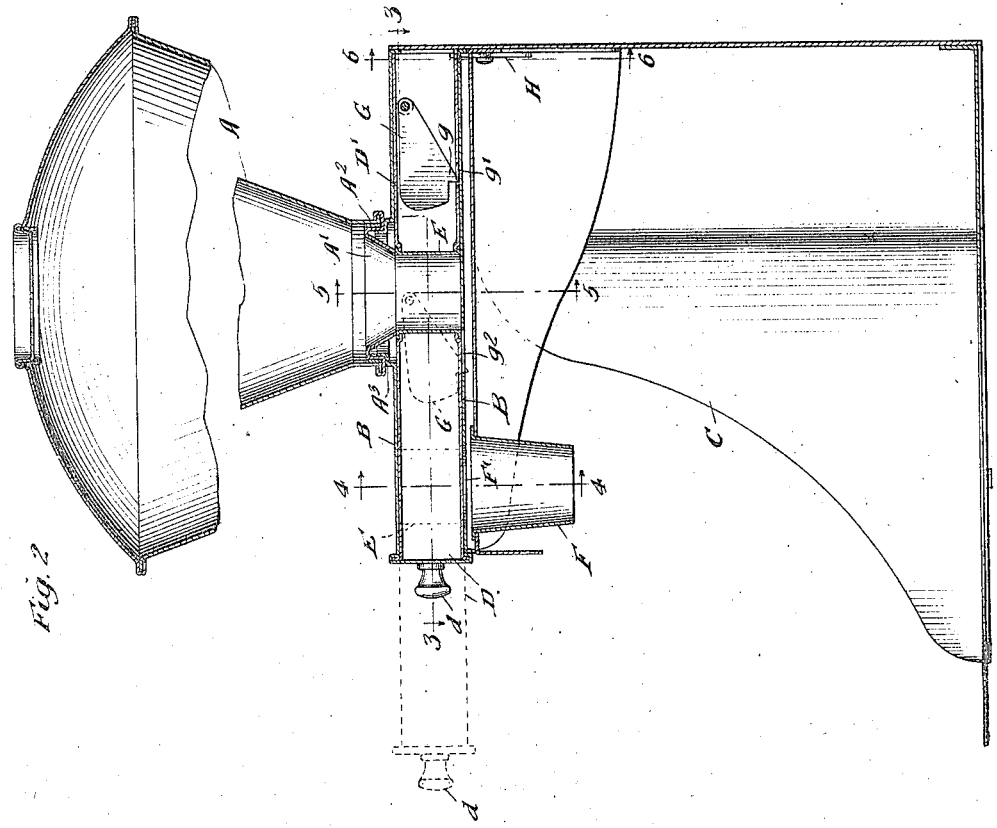
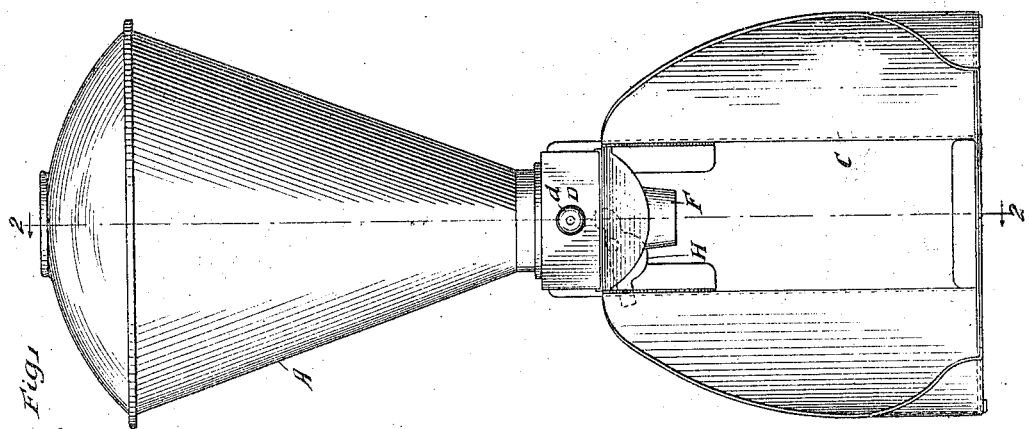
Witnesses:
Wm. Geiger
Pearl Abrams.
Inventor:
William P. DunLany
By Munday, Evarts, Adcock & Clarke,
his Attys

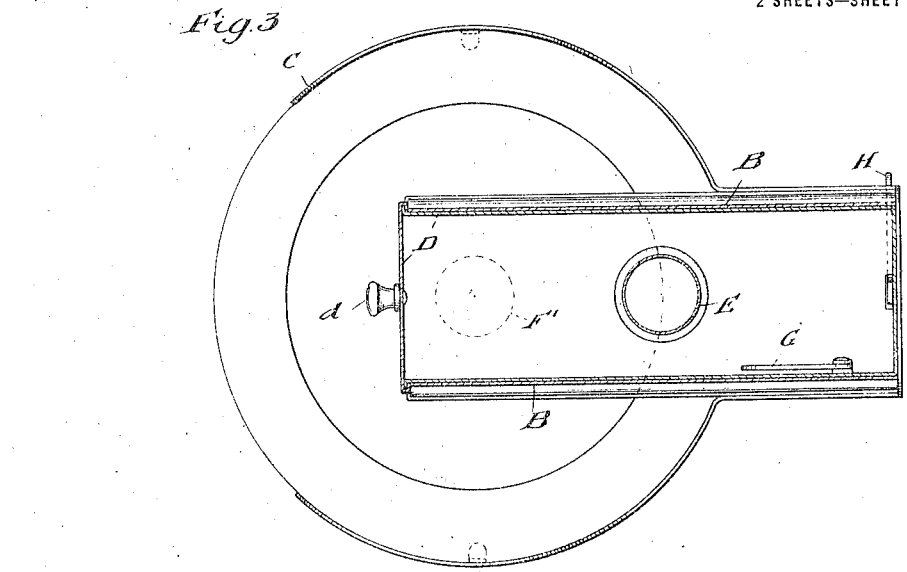
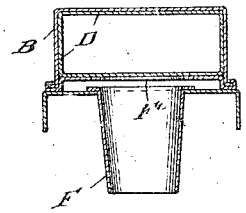
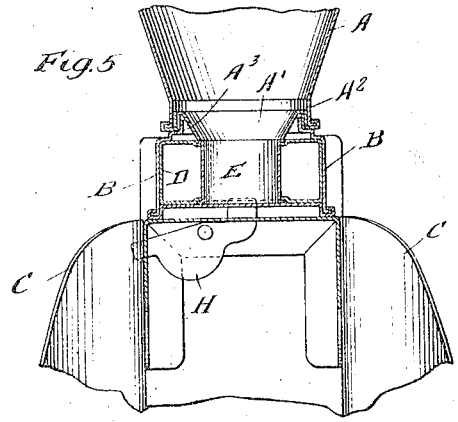
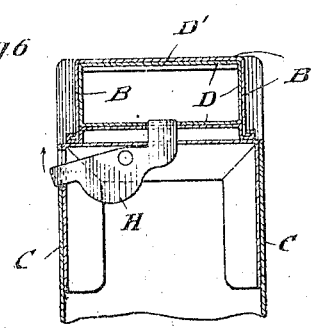

UNITED STATES PATENT OFFICE.

WILLIAM P. DUN LANY, OF MAYWOOD, ILLINOIS, ASSIGNOR TO CHAS. W. SHONK COMPANY, OF CHICAGO, ILLINOIS, A CORPORATION OF NEW JERSEY.

APPARATUS FOR DISPENSING GRANULAR SUBSTANCES.

1,198,014.

Specification of Letters Patent. Patented Sept. 12, 1916.

Application filed December 13, 1912. Serial No. 736,474.

*To all whom it may concern:*

Be it known that I, WILLIAM P. DUN LANY, a citizen of the United States, residing in Maywood, in the county of Cook and State of Illinois, have invented a new and useful Improvement in Apparatus for Dispensing Granular Substances, of which the following is a specification.

This invention relates to an improvement in apparatus for dispensing granular substances and the invention consists in the novel parts and devices and combinations of parts and devices hereinafter more fully set forth and made the subject matter of claim.

In the accompanying drawing Figure 1 is a front elevation of the dispensing apparatus. Fig. 2 is a vertical section, upon a larger scale, taken upon the line 2—2 of Fig. 1; Fig. 3 a horizontal section on the line 3—3 of Fig. 2; Fig. 4 a vertical section on the line 4—4 of Fig. 2; Fig. 5 a vertical section upon the line 5—5 of Fig. 2; Fig. 6 is a vertical section on line 6—6 of Fig. 2.

In the said drawings A represents the container for the granular substance to be dispensed. It is made in the form of an inverted cone, and at the bottom is formed with the funnel discharge $A^1$, and a ring portion $A^2$ adapted to fit down over a ring or collar $A^3$ formed on the tubular housing B. The structure is such, as will be seen, that the container A, with its funnel discharge $A^1$, may be readily applied to or removed from the housing. The housing B which forms a long, rectangular, tubular structure open at the front end, is carried upon the sheet metal base C. Within the housing is the sliding drawer D which may by the knob $d$, be moved in and out. This drawer carries the open ended cylinder or tube E, which when the drawer is pushed entirely in, until the rear of the housing is struck as a stop to position the same, coincides at its upper open end with the mouth of the funnel $A^1$, and when the drawer is pulled out into the position indicated in dotted lines in Fig. 2, coincides at its lower open end with the discharge funnel F and an opening $F^1$ in the bottom of the housing B. A weighted pawl G pivoted to the drawer, has its engaging tooth $g$ projecting through a slot $g^1$ in the bottom of said drawer and this pawl rides upon the surface of the floor of the housing until the drawer is in the outer position with the measuring cylinder E over the discharge funnel F, at which point said pawl engages a slot $g^2$ in the bottom of the housing which thus forms a stop to prevent the drawer from being pulled out farther. When the drawer is pushed in, this pawl rides out of the slot and permits the drawer to be returned. On the rear face of the housing is the weighted latch H, the point of which projects up and engages a slot in the bottom of the drawer D, serving to lock the drawer closed and to prevent the opening of the same until said latch is lifted. When upon occasion it becomes necessary to remove the drawer D, for cleaning or for other purpose, the entire apparatus may be inverted whereupon the weight of the pawl G will prevent it from engaging the front stop and the drawer may be entirely withdrawn. The pawl offers no resistance of course to the drawer being replaced, when the apparatus is right side up.

The operation of the apparatus in dispensing is as follows: The container A being filled with any granular material which is to be dispensed, said material flows down through the funnel opening $A^1$ into the measuring tube or open ended cylinder E, filling the same with the measured quantity resting below on the floor or supporting plate of the housing. The operator may now place a receiving vessel under the discharge spout F, and, raising the latch H, may pull the drawer D out, until the pawl G engages the slot $g^2$ or front stop when the measuring tube or open ended cylinder E will be over the discharge spout F, whereupon the contents of said measuring cylinder will flow down and be discharged through said spout. When, in the foregoing action, the measuring cylinder E has passed from under the funnel $A^1$, the upper face or plate $D^1$ of the tubular drawer D passes under said funnel $A^1$ and sustains the contents of the container A, acting thus as a cut-off plate. When the contents of the measuring cylinder have been discharged through the nozzle F, the drawer may then be pushed back into place, whereupon the measuring cylinder will be again filled with the granular material and the latch H will again lock the drawer closed. This operation may be repeated, discharging the measured quantity of the granular material, at each repetition, until the entire contents of the container A have been thus dispensed. It will be seen that the to and fro movement of the drawer is controlled by both a back and front stop, so that the operator need pay no attention to the distance moved, beyond the requirement that the drawer shall be pushed in and pulled out as far as it will go in either direction, and that an upper and lower plate serve to close the container funnel and to support the measured material while the measuring tube is moving to the discharge point.

I claim:—

1. A dispensing apparatus of the character described including, in combination: a stand having a floor therein, said floor being provided with a discharge opening; a container mounted on said stand above the floor and provided also with a discharge opening; a measuring, open-ended tube movably mounted above said floor and adapted to be brought at different times into alinement with said discharge openings; and a gravity-operating latch mounted under the said floor and passing through the same to engage the drawer, and having means extending without the casing for manipulation, and adapted to lock the measuring tube when in position beneath the discharge opening of the container.

2. A dispensing apparatus of the character described including, in combination: a stand having a floor member provided with a discharge opening; a drawer slidably mounted in said stand over said floor, said drawer having an open-ended measuring tube carried thereby; a container mounted on said stand, said container having a discharge opening out of alinement with the discharge opening in said floor; and means for limiting the outward movement of said drawer, said means including a pivotally mounted gravitating pawl carried within the drawer; and a locking latch independent of the pawl having means for operating it which extend to the exterior of the stand.

3. A dispensing apparatus of the character described including, in combination: a stand; a movably mounted measuring, open-ended member carried by said stand; a container detachably mounted on said stand; and a gravitating pawl for limiting the withdrawal of the measuring member, which pawl can be released by detaching the container and inverting the stand, and is prevented and secured from operation until the stand be inverted.

4. A dispensing apparatus of the character described including, in combination: a stand having a floor provided with a discharge opening; a container mounted on said stand above the floor and provided also with a discharge opening out of alinement with the first named discharge opening; a drawer slidably mounted on said stand and over said floor and provided with a measuring portion adapted to be brought alternately into alinement with said discharge openings; a gravitating pawl for limiting the outward movement of the drawer; and a pivotally mounted dog H adapted to engage the drawer and lock it when in its innermost position and having a laterally extended operating end.

WILLIAM P. DUN LANY.

Witnesses:
WILLIAM A. GEIGER,
ESTHER ABRAMS.